(12) United States Patent
Pucci et al.

(10) Patent No.: US 12,233,585 B2
(45) Date of Patent: Feb. 25, 2025

(54) METHOD AND APPARATUS FOR PRODUCING A DISPENSING PART OF A CONTAINER, AND DISPENSING PART OF A CONTAINER

(71) Applicant: SACMI COOPERATIVA MECCANICI IMOLA SOCIETA' COOPERATIVA, Imola (IT)

(72) Inventors: Fabrizio Pucci, Castel Guelfo di Bologna (IT); Fiorenzo Parrinello, Medicina (IT)

(73) Assignee: SACMI COOPERATIVA MECCANICI IMOLA SOCIETA' COOPERATIVA, Imola (IT)

( * ) Notice: Subject to any disclaimer, the term of this patent is extended or adjusted under 35 U.S.C. 154(b) by 126 days.

(21) Appl. No.: 17/601,137

(22) PCT Filed: Apr. 3, 2020

(86) PCT No.: PCT/IB2020/053182
§ 371 (c)(1),
(2) Date: Oct. 4, 2021

(87) PCT Pub. No.: WO2020/202085
PCT Pub. Date: Oct. 8, 2020

(65) Prior Publication Data
US 2022/0212388 A1    Jul. 7, 2022

(30) Foreign Application Priority Data
Apr. 5, 2019   (IT) ........................ 102019000005206

(51) Int. Cl.
*B29C 48/00*   (2019.01)
*B29C 31/04*   (2006.01)
(Continued)

(52) U.S. Cl.
CPC ........ *B29C 48/0011* (2019.02); *B29C 31/048* (2013.01); *B29C 43/08* (2013.01);
(Continued)

(58) Field of Classification Search
CPC ... B29C 48/0011; B29C 31/048; B29C 43/08; B29C 43/203; B29C 43/34;
(Continued)

(56) References Cited

U.S. PATENT DOCUMENTS 7,156,631 B2   1/2007  Ozeki
8,025,825 B2   9/2011  Gruau et al.
(Continued)

FOREIGN PATENT DOCUMENTS

CN       1549768 A    11/2004
CN       1638935 A    7/2005
(Continued)

OTHER PUBLICATIONS

Summarized English translation of Chinese Office Action and Search Report issued Feb. 7, 2023 in corresponding Chinese Patent Application No. 2020800395334, 9 pages.

*Primary Examiner* — Jeffrey M Wollschlager
(74) *Attorney, Agent, or Firm* — Chrisman Gallo Tochtrop LLC (57) ABSTRACT

A method comprises in sequence the steps of:
dispensing a continuous polymeric extrudate in a molten state;
separating from the continuous extrudate a dose substantially having the shape of a parallelepiped, the dose having a separation surface at which the dose has been separated from the continuous extrudate, the dose further having a face adjacent to the separation surface;
conveying the dose towards a mould comprising a first mould part and a second mould part;
(Continued)

shaping the dose in the mould by moving the first mould part and the second mould part one towards the other in a moulding direction arranged transversally to said face, thereby obtaining a dispensing part of a container. The dispensing part comprises:
- an edge zone suitable for being joined to a container body;
- a neck surrounding a passage through which a product contained in the container can be dispensed;
- a membrane which closes the passage, the passage being intended to be opened after the shaping step, so that said product can flow out.

14 Claims, 6 Drawing Sheets

(51) Int. Cl.
| | |
|---|---|
| *B29C 43/08* | (2006.01) |
| *B29C 43/20* | (2006.01) |
| *B29C 43/34* | (2006.01) |
| *B29C 48/21* | (2019.01) |
| *B29C 48/355* | (2019.01) |
| *B29L 1/00* | (2006.01) |
| *B29L 23/20* | (2006.01) |
| *B29L 31/56* | (2006.01) |

(52) U.S. Cl.
CPC ............ *B29C 43/203* (2013.01); *B29C 43/34* (2013.01); *B29C 48/0022* (2019.02); *B29C 48/21* (2019.02); *B29C 48/355* (2019.02); B29C 2043/3411 (2013.01); B29C 2043/3472 (2013.01); B29C 2043/3488 (2013.01); B29K 2995/0067 (2013.01); B29L 2001/00 (2013.01); B29L 2023/20 (2013.01); B29L 2031/56 (2013.01)

(58) Field of Classification Search
CPC ... B29C 48/0022; B29C 48/21; B29C 48/355; B29C 2043/3411; B29C 2043/3472; B29C 2043/3488; B29K 2995/0067; B29K 2101/12; B29L 2001/00; B29L 2023/20; B29L 2031/56; B29L 2031/712; B65D 35/10
See application file for complete search history.

(56) References Cited

U.S. PATENT DOCUMENTS

| | | | |
|---|---|---|---|
| 8,911,225 | B2 | 12/2014 | Asano et al. |
| 9,079,339 | B2 | 7/2015 | Pucci et al. |
| 2004/0036195 | A1* | 2/2004 | Fillmore ............... B29C 70/683 |
| | | | 264/268 |
| 2005/0051928 | A1* | 3/2005 | Gruau ................... B29C 43/42 |
| | | | 264/320 |
| 2010/0201032 | A1* | 8/2010 | Asano ................... B29C 31/048 |
| | | | 425/352 |
| 2011/0018166 | A1* | 1/2011 | Pucci ..................... B29C 43/18 |
| | | | 264/266 |
| 2012/0031870 | A1* | 2/2012 | Porter .................... B29B 11/08 |
| | | | 215/40 |
| 2015/0014355 | A1 | 1/2015 | Julien |
| 2015/0114993 | A1 | 4/2015 | Kerman et al. |
| 2015/0209228 | A1* | 7/2015 | Bruce .................... A61J 1/067 |
| | | | 220/265 |
| 2017/0096280 | A1 | 4/2017 | Julien |
| 2018/0297246 | A1 | 10/2018 | Pucci et al. |

FOREIGN PATENT DOCUMENTS

| | | | |
|---|---|---|---|
| CN | 101835582 A | | 9/2010 |
| CN | 102112282 A | | 6/2011 |
| CN | 108290323 A | | 7/2018 |
| JP | S5495678 A | | 7/1979 |
| WO | 03078126 A2 | | 9/2003 |
| WO | WO2017064601 | * | 4/2017 |

* cited by examiner

METHOD AND APPARATUS FOR PRODUCING A DISPENSING PART OF A CONTAINER, AND DISPENSING PART OF A CONTAINER

The invention relates to a method and an apparatus for producing, by compression moulding, a dispensing part of a container, through which a product contained in the container can be dispensed.

The dispensing part, which may also be called "head", "shoulder", or "spout", is intended to be joined to a container body so as to define, during use, a passage for the outflow of the product present in the container.

The dispensing part may, for example, be suitable for being joined to a container body for obtaining a squeezable container. The squeezable container may be a tube package intended to contain cosmetic products, such as cream or toothpaste, food products, such as mayonnaise or sauce, pharmaceutical products, and others. Alternatively, the squeezable container may be a pouch package, of the type suitable for containing a food product such as a yoghurt, a fruit juice or another beverage.

The dispensing part may also be suitable for being joined to a semi-rigid container body, such as a container body made of a laminated material comprising at least one layer made of paper and one layer made of polymeric material.

Alternatively, the dispensing part could be joined to a rigid container body, for example a bottle body made of polymeric material.

The method and the apparatus according to the invention allow the obtainment of a dispensing part of a container having a multi-layer structure, in particular comprising a plurality of layers made of polymeric material, or having a single-layer structure, that is to say, comprising a single layer of polymeric material.

The invention further relates to a dispensing part of a container intended to be joined to a container body so as to create a squeezable container, or a semi-rigid or rigid container.

Dispensing parts or heads for containers are known, in particular for squeezable tube packages, which comprise two layers of polymeric material. In particular, the prior art heads may comprise an inner layer made, for example, of polyethylene terephthalate (PET), having gas barrier properties, and an outer layer made, for example, of polyethylene (PE), intended to be welded to a tube in order to obtain the squeezable tube package.

The heads of the type described above are obtained by producing two pre-worked head elements, that is to say, an inner pre-worked element, for example made of PET and intended to form the inner layer of the head, and an outer pre-worked element, for example made of PE and intended to form the outer layer of the head. The two pre-worked elements may be produced, for example, by compression moulding. Then, the two pre-worked elements are assembled, in such a way as to obtain the head.

A drawback of the method described above for producing heads for containers is that it involves relatively long production times. In fact, in addition to production of the individual pre-worked head elements, an additional assembly operation is necessary for joining the two pre-worked elements, which increases the production times and consequently the costs. Moreover, the heads for containers produced with the method described above may be difficult to recycle. In fact, in order to produce two pre-worked head elements which can be handled separately, each pre-worked element must have a predetermined minimum thickness and consequently a predetermined minimum weight. That is to ensure that each pre-worked element has a minimum structure strength which allows it to be handled separately. Each material which forms a pre-worked head element is therefore present in a significant quantity in the finished head. Consequently, the polymeric materials which form the two pre-worked head elements can only be recycled if the two pre-worked head elements are separated from each other, which is extremely difficult.

There are also prior art heads for containers which have a single-layer structure, that is to say, which are made using a single polymeric material, which are produced by compression moulding a dose having an annular shape, that is to say, a dose provided with a hole intended to create a dispensing opening in the head.

However, the annular doses have the disadvantage of being quite difficult to obtain and to handle.

An object of the invention is to improve the methods and the apparatuses for producing dispensing parts for containers, as well as the dispensing parts of containers of a known type.

Another object is to provide a method and an apparatus which allow the production of dispensing parts for containers, in a simple way and with good productivity.

A further object is to provide a method and an apparatus which allow the production of dispensing parts for containers, for example having a multi-layer structure, which can easily be recycled.

In a first aspect of the invention, there is provided a method comprising in sequence the steps of:
  dispensing a continuous polymeric extrudate in the molten state;
  separating from the continuous polymeric extrudate a dose substantially having the shape of a parallelepiped, the dose having a separation surface along which the dose has been separated from the continuous extrudate, the dose further having a face adjacent to the separation surface;
  conveying the dose towards a mould comprising a first mould part and a second mould part;
  shaping the dose in the mould by moving the first mould part and the second mould part one towards the other along a moulding direction arranged transversally to said face, thereby obtaining a dispensing part of a container, the dispensing part comprising:
  an edge zone suitable for being joined to a container body;
  a neck surrounding a passage through which a product contained in the container can be dispensed;
  a membrane which closes the passage, the passage being intended to be opened after the shaping step, so that said product can flow out.

Owing to the first aspect of the invention, it is possible to obtain a dispensing part of a container in a simple way and with good productivity. In particular, the dispensing part of a container may be produced by compression moulding a dose substantially having the shape of a parallelepiped, that is to say, a dose which is particularly simple to produce and handle.

In fact, the parallelepiped dose may be obtained by a simple cutting operation for cutting the continuous polymeric extrudate, which avoids using complex devices for dispensing the annular doses seen in the prior art. Moreover, the parallelepiped dose does not result in the production of waste.

Finally, the parallelepiped dose can be conveyed simply, without undergoing excessive deformations, for example by keeping one of its faces adhering to a substantially flat conveying surface.

In an embodiment, the continuous polymeric extrudate is a multi-layer extrudate and the dose has a plurality of layers arranged parallel to its face adjacent to the separation surface.

By using a dose comprising a plurality of layers, it is possible to obtain a dispensing part having a multi-layer structure with a single shaping step, in which all of the layers of the dispensing part are simultaneously shaped. Therefore, it is not necessary to separately produce and then assemble a plurality of pre-worked elements of a dispensing part, each pre-worked element being made of a different material, as happened in the prior art. Moreover, owing to the moulding direction arranged transversally, specifically perpendicularly, to the face of the dose to which the layers of which the multi-layer dose is composed are parallel, the materials of those layers are able to flow evenly over the entire extent of the dispensing part. Finally, by simultaneously shaping all of the layers, one or more layers of the plurality of layers may have a small thickness as desired, provided that it does not tear during the shaping step. That makes the dispensing part easier to recycle, since it is possible to ensure that the material forming the thinnest layer is present in a percentage which is less than a predetermined minimum, so that the whole dispensing part can be considered recyclable based on the regulations in force.

In an embodiment, during the conveying step, there is provided changing the orientation of the dose from an initial orientation to a final orientation, in which the above-mentioned face of the dose is positioned transversally, specifically perpendicularly, to the moulding direction.

In the final orientation, the above-mentioned face of the dose may lie in a substantially horizontal plane.

In the initial orientation, the above-mentioned face of the dose may be substantially parallel to the moulding direction.

By changing the orientation of the dose during the conveying step, it is possible to make the final orientation of the dose independent of its initial orientation, in such a way that, whatever orientation the dose has at the end of the dispensing step (that is to say, the initial orientation), the dose can enter the mould with the orientation (that is to say, the final orientation) best suited for the shaping step.

In an embodiment, in the initial orientation, the above-mentioned face of the dose lies in a non-horizontal plane, for example in a substantially vertical plane.

In an embodiment, the orientation of the dose may be changed with a rotating movement which the dose performs during the conveying step.

In addition to the rotating movement, during the conveying step the dose may perform a transferring movement along a path towards the mould.

The transferring movement may be a further rotating movement, for example about a central axis which is different from an axis of rotation about which the rotating movement which changes the orientation of the dose occurs.

That allows the orientation of the dose to be changed in a particularly simple way.

In an embodiment, the dose may comprise a plurality of layers including at least one outer layer, intended to remain on the outside of the dispensing part, and one barrier layer, having barrier properties, particularly against gases.

There may also be an inner layer, suitable for facing the inside of the container.

In this case, the barrier layer is located in an intermediate position between the outer layer and the inner layer.

In an embodiment, the passage surrounded by the neck is opened by removing the membrane in a position downstream of the mould, before applying a closing element on the neck.

The closing element may comprise, for example, a cap or a sealing film. Specifically, the membrane may be removed in a plant for producing containers, for example outside the mould and downstream of the latter. In more detail, the membrane may be removed in a position interposed between the mould in which the dispensing part is produced and a welding unit in which the dispensing part is welded to the container body.

In an embodiment, the membrane is removed in a cutting step performed downstream of the mould.

In an embodiment, the cutting step may comprise cutting an end portion of the dispensing part along a cutting plane arranged transversally, for example perpendicularly, to a longitudinal axis around which the neck extends.

The cutting step creates, in the cutting plane, a peripheral edge of the neck, to which a sealing film can subsequently be applied.

The sealing film, which is fixed to the neck for example by welding, is intended to be removed by the consumer when the container is opened for the first time, so that it is possible to dispense the product contained in the container.

If the dose comprises a plurality of layers including at least one barrier layer, by applying the sealing film along the peripheral edge defined in the cutting plane, it is possible to optimise the barrier properties of the container.

In fact, since the barrier layer of the dispensing part emerges in the cutting plane, the barrier layer can be directly joined to the sealing film, which in turn has barrier properties.

In this way, it is possible to minimise, or even eliminate, gaseous exchanges between the inside of the container and the outside environment.

In an embodiment, the cutting step may comprise cutting the membrane frontally along a closed cutting line, for example along a circular cutting line. That allows minimisation of the quantity of material to be eliminated in order to open the passage surrounded by the neck.

In an embodiment, the passage is opened by a user who pierces the membrane after having removed a cap applied on the neck, for example using an end zone of the cap opposite to that in which the cap is applied to the neck.

In this case, the membrane performs a protective function for the product contained in the container, until the moment of use.

In a second aspect of the invention, there is provided an apparatus comprising:
- a dispensing device for dispensing a continuous polymeric extrudate in the molten state;
- a separating element configured to separate from the continuous polymeric extrudate a dose substantially having the shape of a parallelepiped, the dose having a separation surface along which the dose has been separated from the continuous extrudate and a face adjacent to the separation surface;
- at least one mould comprising a first mould part and a second mould part, the first mould part and the second mould part being movable relative to each other along a moulding direction between a closed position, in which a forming chamber is defined between the first mould part and the second mould part, the forming chamber being shaped to obtain a dispensing part of a container, and an open position;

at least one conveying element for conveying the dose along a path towards the mould;

a first movement device for moving the conveying element along said path;

a second movement device for turning the conveying element during said path, so as to change the orientation of the dose until a final orientation is reached with which the dose is released into the mould, said face being arranged transversally to the moulding direction in the final orientation.

This allows the obtainment of a dispensing part of a container in a simple way and with good productivity, as described in more detail with reference to the first aspect of the invention.

In an embodiment, the first mould part comprises a punch intended for shaping an inner surface of the dispensing part.

The second mould part comprises a cavity intended for shaping an outer surface of the dispensing part.

In an embodiment, the first mould part is positioned below the second mould part.

By positioning the first mould part below the second mould part, the conveying element can release the dose by making it fall onto an upper region of the punch. This minimises the distance that the dose has to travel as it falls freely from the conveying element. This allows a reduction in deformations of the dose and increases its positioning precision in the mould.

In a third aspect of the invention, there is provided a dispensing part of a container, the dispensing part having a multi-layer structure which includes at least two layers of polymeric material, wherein the dispensing part comprises:

an edge zone suitable for being joined to a container body;

a neck extending around a longitudinal axis and surrounding a passage through which a product contained in the container can be dispensed;

wherein the neck is delimited, on the opposite side to the edge zone, by a free edge which lies in a plane positioned transversally to the longitudinal axis, said at least two layers of polymeric material both emerging on the free edge.

If one of said at least two layers of polymeric material is a barrier layer having barrier properties against gases and/or light, the dispensing part according to the third aspect of the invention may be used for producing a container having particularly good barrier properties. In fact, it is possible to join to the free edge, for example by welding, a sealing film which also has good barrier properties against gases and/or light. Since the barrier layer of the dispensing part emerges on the free edge, the sealing film can be joined to the barrier layer of the dispensing part, which allows optimisation of the barrier properties of the final container.

In an embodiment, said at least two layers of polymeric material comprise a functional layer, for example a barrier layer.

The functional layer is bent towards the longitudinal axis near the free edge delimiting the neck.

Thus, the functional layer has a tubular shape with a transversal dimension that, at the free edge, is smaller than the transversal dimension of the functional layer at a portion of the neck opposite the edge zone.

The transversal dimension which decreases towards the free edge is a diameter of the functional layer, if the neck is substantially cylindrical.

Thus, the dimensions of the passage at the free edge can be reduced, which allows a reduction in the dimensions of a sealing film intended to be joined to the free edge in order to close the passage. Consequently, it is possible to have a saving in the quantity of sealing film to be used.

The invention can be better understood and implemented with reference to the accompanying drawings, which illustrate several example, non-limiting embodiments of it, in which.

Hereinafter are described a method and an apparatus for producing, by compression moulding, a dispensing part 2 of a container intended to be coupled to a container body for creating a finished container. The dispensing part 2 may also be defined as a "head", or "shoulder", or "spout". In the example described below with reference to FIGS. 1 to 8, the dispensing part 2 is usable in a tube package. In more detail, the above-mentioned dispensing part 2 is intended to be joined to a flexible tube, which can be squeezed by a user to make a product contained in the tube come out through a dispensing opening in the dispensing part.

Figure 6:
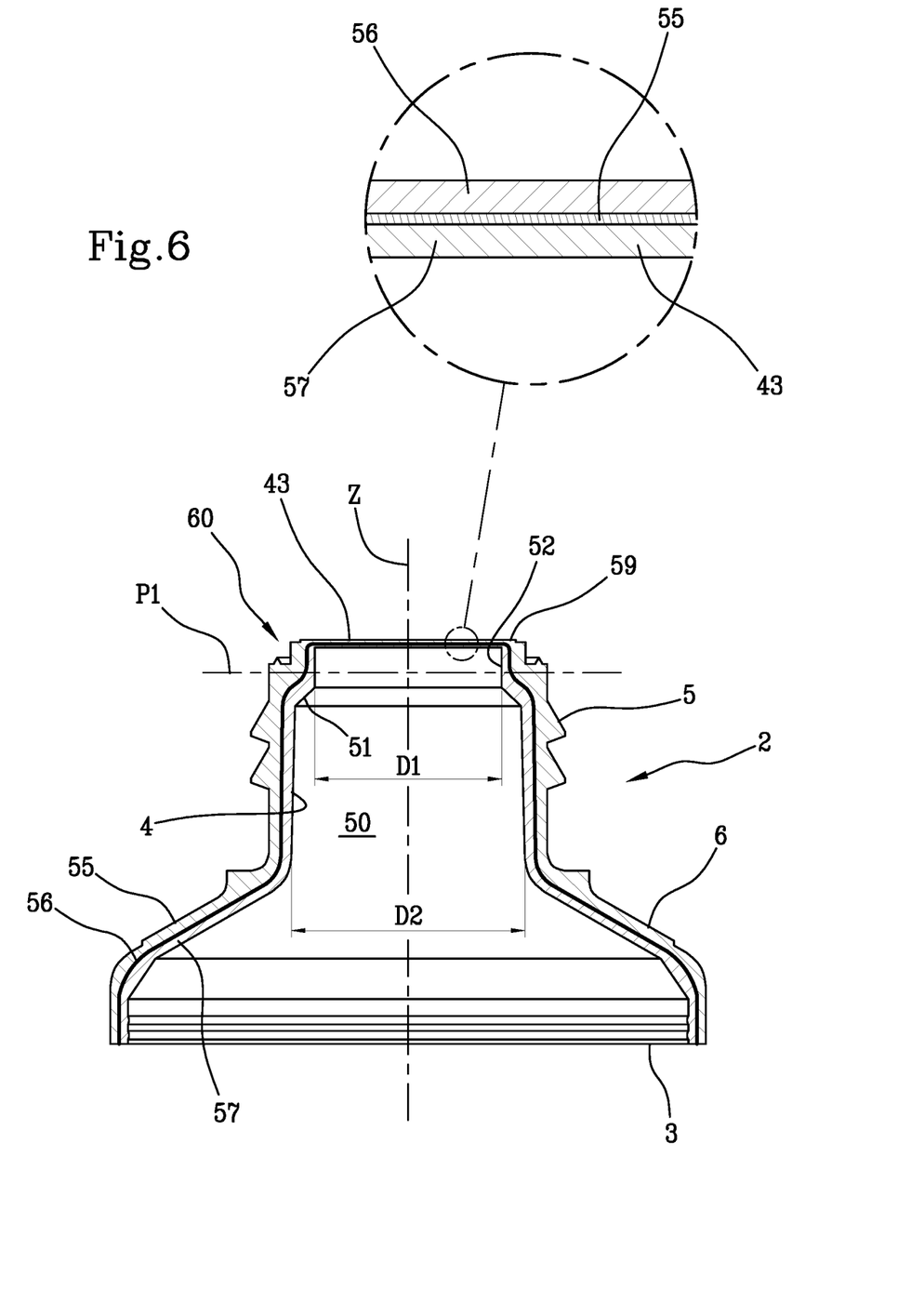
FIG. 6 is a cross-section, showing a dispensing part for a tube package.

As shown in FIG. 6, the dispensing part 2 comprises an edge zone 3, intended to be joined to the flexible tube, for example by welding.

The dispensing part 2 further comprises a neck 4, positioned on the opposite side to the edge zone 3. The neck 4 may be externally provided with an element for removable fixing, which may comprise a thread 5, suitable for allowing a cap to be selectively fixed to the neck 4 for closing the dispensing opening. The neck 4 extends around a longitudinal axis Z.

In an alternative embodiment not illustrated, the element for removable fixing may be absent. In this case, the container (for example the tube package) obtained by joining the dispensing part 2 to a container body may be closed by a sealing film fixed to a free upper edge of the neck 4, for example by gluing or welding.

An intermediate portion 6 is interposed between the neck 4 and the edge zone 3, the intermediate portion 6 having a transversal dimension which gradually decreases from the edge zone 3 towards the neck 4. If the dispensing part 2 is designed to be joined to a cylindrical tube, the intermediate portion 6 has a frustoconical shape, like an upside-down funnel, and the transversal dimension which gradually decreases is a diameter. However, the dispensing part 2 may also have other shapes, for example if the dispensing part 2 is intended to be joined to a tube having an oval or elliptical cross-section.

Inside the neck 3 a passage 50 is defined through which a substance contained in the tube package can be dispenses. The passage 50, which may have a cylindrical shape, extends along the axis Z.

The dispensing part 2 comprises a membrane 43 provided at an end of the neck 4 opposite to the edge zone 3.

The membrane 43 closes the passage 50.

The membrane 43 extends transversally, specifically perpendicularly, to the axis Z.

In the example shown in FIG. 6, the membrane 43 has a flat shape.

In plan view, the membrane 43 may have a circular shape.

The thickness of the membrane 43 is less than the thickness of the intermediate portion 6.

In particular, the thickness of the membrane 43 may be between 0.05 and 0.7 mm. The thickness of the membrane 43 depends on various factors, including the ways in which the membrane 43 is intended to be removed or pierced, which will be described below.

In the example illustrated, as shown in FIG. 6, the membrane 43 has a diameter D1. The neck 4 has an internal diameter D2, which may be greater than the diameter D1.

In more detail, in the example illustrated the membrane 43 extends starting from a cylindrical surface 52, extending around the axis Z and centred relative to that axis, which internally delimits the end of the neck 4 opposite to the edge zone 3. The diameter of the cylindrical surface 52 is D1. The neck 4 has a narrowing 51, for passing from the internal diameter D2 to the diameter D1.

The membrane 43 extends inside a free edge 59, which delimits the neck 4 at an upper end thereof, that is to say on the opposite side to the edge zone 3. The free edge 59 may be at the same level as the membrane 43, or at higher or lower level.

In the example illustrated, the dispensing part 2 has a multi-layer structure. Specifically, the dispensing part 2 comprises a central layer 55, which may for example be a functional layer such as a barrier layer made of a material having barrier properties against gases and/or light.

The dispensing part 2 further comprises an outer layer 56 and an inner layer 57, intended for facing respectively towards the outside and towards the inside of the tube package. The central layer 55 is arranged in an intermediate position between the outer layer 56 and the inner layer 57. Any further layers may be interposed between the central layer 55 and the outer layer 56, and/or between the central layer 55 and the inner layer 57.

As is clearly visible in the enlargement of FIG. 6, the central layer 55 is present in the membrane 43. The central layer 55 is also present in other regions of the dispensing part 2 which are distinct from the membrane 43, in particular in the neck 4 and in the intermediate portion 6. The central layer 55 may also be present in the edge zone 3.

In the membrane 43, at least the outer layer 56 and the inner layer 57 are thinner than in the neck 4 and in the intermediate portion 6.

The intermediate layer 55 has, in a cross-section, a profile which follows the geometry of the neck 4. In particular, close to the narrowing 51, the intermediate layer 55 is folded towards the inside of the neck 4, i.e. towards the axis Z. Thus, a transversal dimension (for example a diameter) of the intermediate layer 55 decreases along the neck 3 in a direction towards the membrane 43.

The passage 50 is intended to be opened so as to allow the substance contained in the tube package to flow to the outside of that package.

Figure 7:
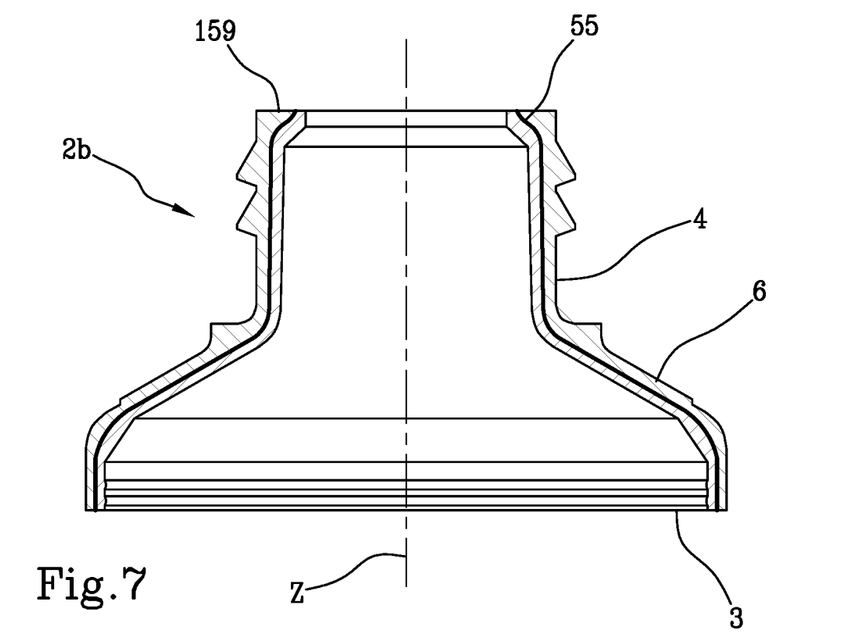
FIG. 7 is a cross-section like that of FIG. 6, showing the dispensing part after a cutting operation which has removed a membrane which initially closed a passage of the neck.
Figure 8:
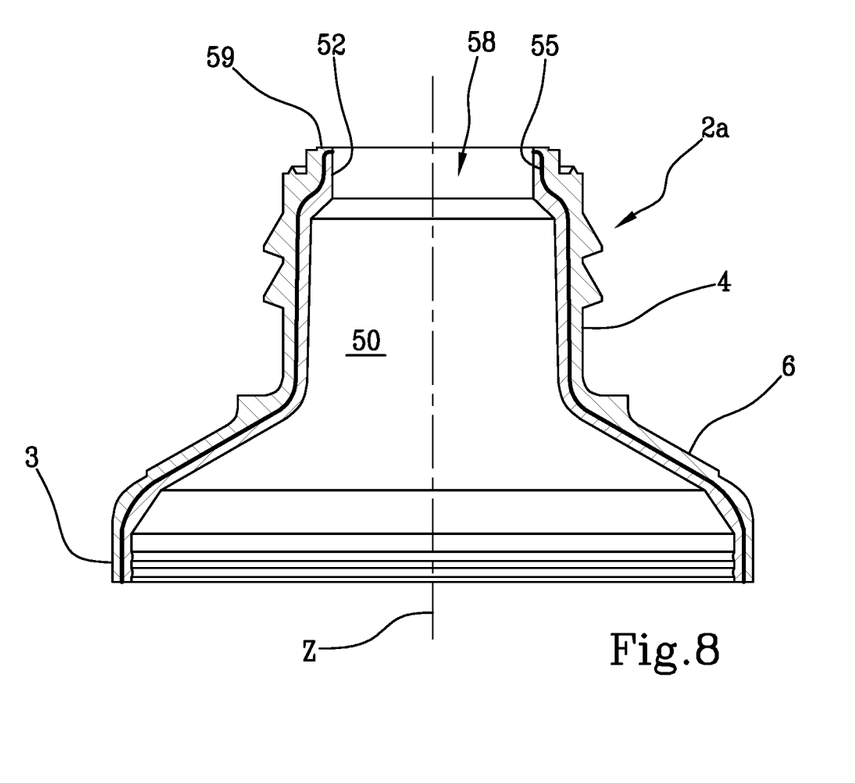
FIG. 8 is a cross-section like that of FIG. 6, showing the dispensing part after a cutting operation which has removed a membrane which initially closed a passage of the neck, the cutting operation being performed according to a method different to that of FIG. 7.

In the embodiment shown in FIGS. 6 to 8, the passage 50 is opened by removing the membrane 43 after the dispensing part 2 has been produced by compression moulding.

In particular, the membrane 43 can be removed in a cutting step, which can be performed before joining the dispensing part 2 to the tube, or possibly even afterwards.

During the cutting step, the membrane 43 can be cut frontally, from the inside of the dispensing part 2 or from the outside of the dispensing part 2. In particular, the membrane 43 can be cut along a closed cutting line which extends around the axis Z. The closed cutting line may be a circular cutting line.

FIG. 8 shows an open dispensing part 2a, obtained by removing the membrane 43 from the dispensing part 2 shown in FIG. 6, according to a first cutting method.

In the example shown in FIG. 8, the membrane 43 has been cut frontally along a circular cutting line having a diameter equal to the diameter D1, or slightly less than that diameter, in such a way as to separate the membrane 43 from the dispensing part 2 at, or very near to, the cylindrical surface 52. This defines a dispensing opening 58, through which the substance contained in the tube package can be dispensed in an outside environment, after having passed through the passage 50.

The nearer the diameter of the circular cutting line is to the diameter D1 of the membrane 43, the wider the dispensing opening 58 is.

As shown in FIG. 8, after the membrane 43 has been removed, the central layer 55 emerges in a position facing the axis Z, specifically on the cylindrical surface 52.

A sealing film, not illustrated, may be joined to the free edge 59, for example by welding, the film being suitable for hermetically closing the tube package. The sealing film is intended to be removed or pierced by a user, the first time the tube package is opened.

FIG. 7 shows an open dispensing part 2b, obtained by removing the membrane 43 from the dispensing part 2 shown in FIG. 6, according to an alternative cutting method.

Also in this embodiment, the passage 50 is opened by removing the membrane 43 after the dispensing part 2, shown in FIG. 6, has been produced by compression moulding. That is done in a cutting step, which can be performed before joining the dispensing part 2 to the tube, or possibly even afterwards.

In particular, during the cutting step an end portion 60 of the dispensing part 2 is cut along a cutting plane P1, whose trace is shown in FIG. 6.

The plane P1 may be arranged transversally, for example perpendicularly, to the axis Z.

The end portion 60 may have the shape of a convex projection, comprising the membrane 43 and an end stretch of the neck 4.

At the end of the cutting step, the end portion 60 is removed and on the open dispensing part 2b there remains defined a free edge 159 which delimits the neck 4 on the opposite side to the intermediate portion 6.

As was the case before for the free edge 59, the free edge 159 may have the shape of a flat circular crown.

A sealing film may subsequently be applied to the free edge 159 for closing the tube package.

As shown in FIG. 7, after the cutting step the central layer 55 emerges on the free edge 159. After application of the sealing film to the free edge 159, the sealing film is therefore substantially in contact with the central layer 55.

If the central layer 55 and the sealing film have barrier properties, it is therefore possible to minimise, or even eliminate, the zones of the dispensing part which have non-optimum barrier properties.

The embodiment shown in FIG. 7 therefore allows optimisation of the barrier properties of the dispensing part, and more generally reduction or elimination of any less well-performing zones in a position interposed between the sealing film and the dispensing part 2b.

On the other hand, the embodiment in FIG. 8 allows minimisation of the quantity of material forming the membrane 43, which must be thrown away (and hopefully recycled) after the membrane 43 has been removed.

However, the quantity of material to be removed is very small, both in the embodiment of FIG. 7 and in the embodiment of FIG. 8, in particular owing to the low thickness of the membrane 43 and respectively of the end portion 60.

It is stressed that, owing to the reduction in the diameter of the intermediate layer 55 near the narrowing 51, it is possible to minimize the dimensions of the sealing film that has to be applied on the free edge 59, 159 for closing the passage 50.

In the examples illustrated, the membrane 43 has the shape of a flat disk. That simplifies production of the membrane 43, as well as minimising the quantity of material which forms that membrane. However, other shapes of the membrane 43 are possible, which could for example be concave, or convex, or have other forms.

In the example illustrated, the membrane 43 has a substantially uniform thickness. However, this condition is also not necessary.

Moreover, the membrane 43, or the end portion 60, could have weakening lines, for example in the form of local thinning or scoring which does not pass through the whole thickness of the membrane 43 or respectively of the end portion 60. The weakening lines allow facilitated breaking of the membrane 43, or of the end portion 60, in predetermined positions.

The membrane which closes the passage 50, instead of being removed in a cutting step, may be pierced or removed by a user, the first time the tube package is opened. In particular, the membrane which closes the passage 50 may be pierced using a piercing element specially prepared at one end of the cap opposite to the further end of the cap which engages with the neck 4.

The central layer 55 is not necessarily a layer made of a material having barrier properties against gases and/or light. For example, the central layer 55 could be a layer made, partly or completely, of a recycled polymeric material, or filled with special fillers. In this case, the inner layer 57 and the outer layer 56 prevent the material of the central layer 55 from making contact with the product contained in the container, and/or from being visible from the outside.

The dispensing part 2 may comprise a number of layers different to what is shown in FIGS. 6 to 8. In particular, the dispensing part 2 could comprise only two layers of polymeric material.

In an embodiment not illustrated, the dispensing part 2 could also have a single-layer structure, that is to say, be formed by a single layer of polymeric material.

The dispensing part 2 is not necessarily intended to be joined to a squeezable tube in order to form a tube package.

For example, a dispensing part of a container similar to that shown in FIGS. 6 to 8 could be intended to be joined to a flexible container body, for obtaining a pouch container. Alternatively, a dispensing part of a container similar to that shown in FIGS. 6 to 8 could be joined to a semi-rigid container body, for example made by folding and welding a laminated packaging material.

Figure 9:
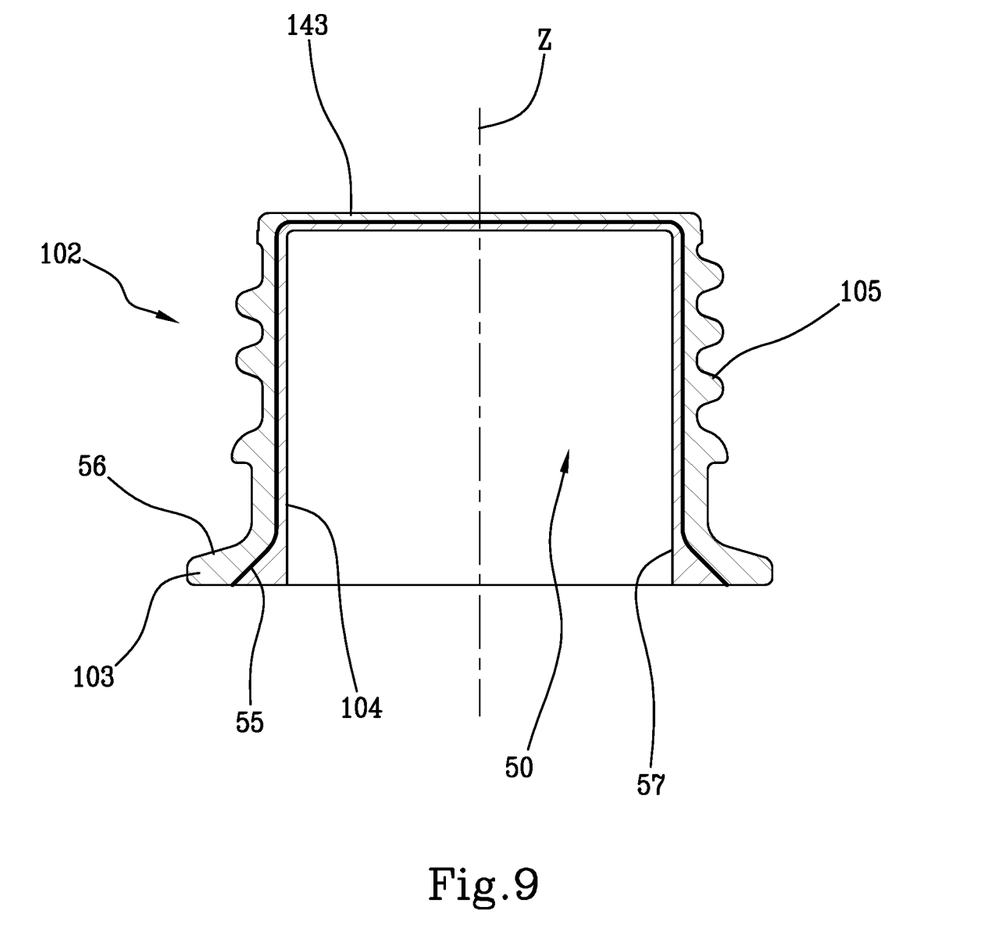
FIG. 9 is a cross-section, showing a dispensing part according to an alternative embodiment, suitable for being joined to a rigid container body.

The dispensing part of a container could also be intended to be joined to a rigid or semi-rigid container made of polymeric material, for example a bottle, as in the case of the dispensing part 102 of a container shown in FIG. 9.

The dispensing part 102 comprises a neck 104, extending around an axis Z, and having a substantially cylindrical shape. On the outside of the neck 104 an element for removable fixing may be provided, the means for removable fixing being suitable for removably engaging with a cap, not illustrated. The means for removable fixing may comprise a thread 105.

The dispensing part 102 further comprises, on the opposite side to the neck 104, an edge zone 103 suitable for being joined to a container body, not illustrated, for example by gluing or welding. In the example illustrated, the edge zone 103 has the shape of an annular protuberance which projects from the neck 104.

The edge zone 103 may have a diameter equal to, or greater than, an external diameter of the thread 105.

A membrane 143 is further provided, the membrane 143 being positioned at one end of the neck 104 opposite to the edge zone 103, so as to close a passage 50 surrounded by the neck 104.

The membrane 143 is similar to the membrane 43 shown in FIGS. 6 to 8. The membrane 143 can be removed by a cutting operation, using methods similar to those described with reference to FIGS. 7 and 8. It is also possible for the membrane 143 to be removed by the user, the first time the container comprising the dispensing part 102 is opened. In this case, the membrane 143 could for example be removed as a consequence of the interaction between the cap and the membrane 143, the first time the cap is unscrewed from the container to open the latter.

For that purpose, the cap may be provided with a hooking element suitable for engaging with a cam profile, not illustrated, provided on the neck 104, in such a way as to produce a lifting of the membrane 143, when the cap is rotated in order to open it. This causes a break in an edge along which the membrane 143 is joined to the neck 104, with a consequent detachment of the membrane 143 from the neck 104.

It is also possible, in particular if the membrane 143 is removed due to interaction with the cap, that on the dispensing part 102, directly on the membrane 143 or near it, one or more scored lines or weakening lines are provided.

In the example illustrated, the dispensing part 102 has a multi-layer structure, but its structure could also be of the single-layer type.

Figure 1:
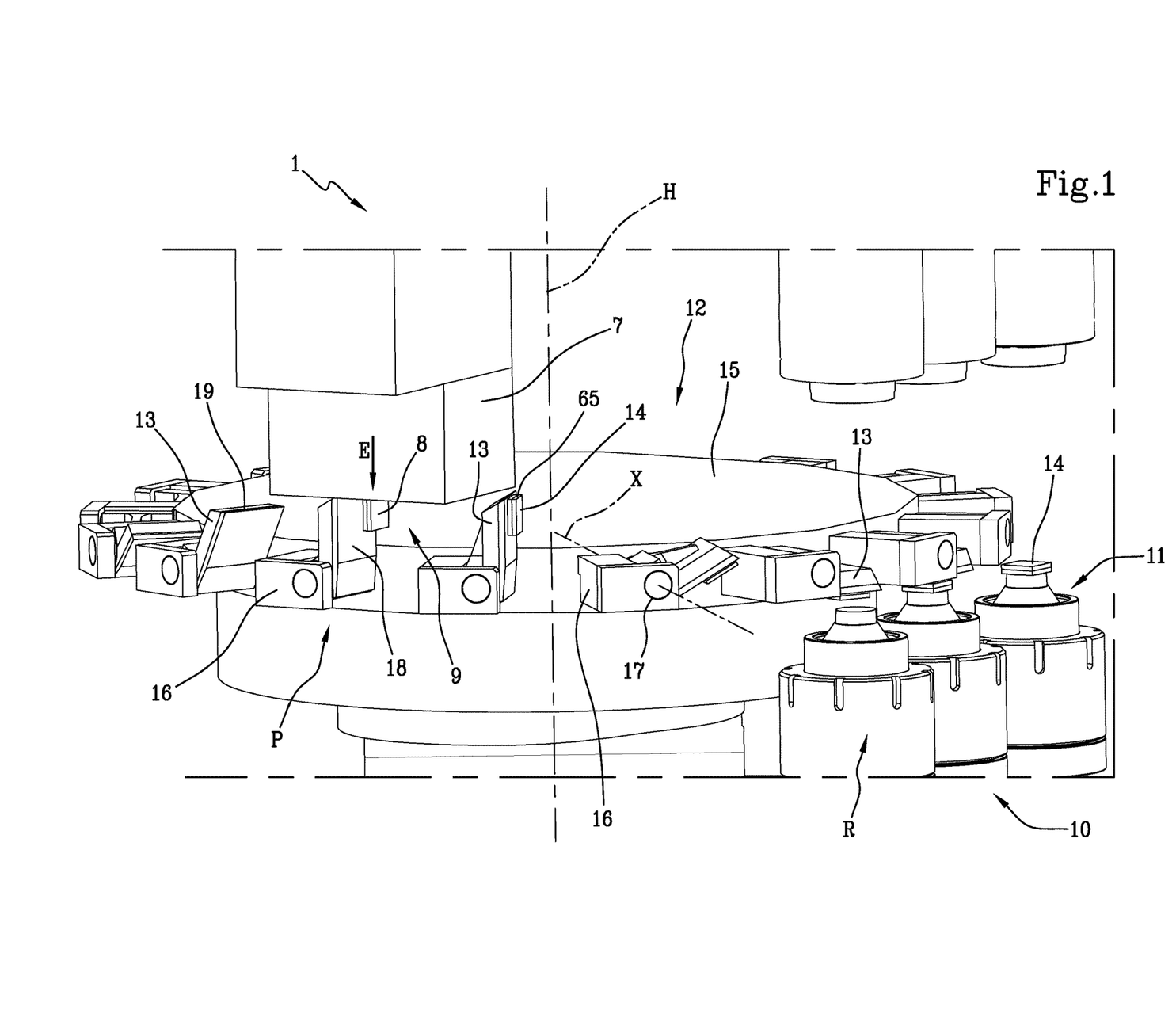
FIG. 1 is a perspective view showing a portion of an apparatus for producing dispensing parts of a container.

FIG. 1 shows an apparatus 1 for producing, by compression moulding, a dispensing part 2 of the type shown in FIG. 6. The apparatus 1 can also be used for producing the dispensing part 102 shown in FIG. 9, or other, similar dispensing parts.

The apparatus 1 comprises a dispensing device for dispensing a continuous polymeric extrudate 8 in the molten state. In the example illustrated, the dispensing device comprises a co-extrusion device 7 for dispensing an extrudate 8 having a multi-layer structure, that is to say, comprising a plurality of layers of polymeric materials which are different to each other. However, this condition is not necessary. In fact, the dispensing device of the apparatus 1 could alternatively be configured to dispense an extrudate 8 having a single-layer structure.

The co-extrusion device 7 may in particular be configured to dispense an extrudate 8 comprising an intermediate layer, interposed between two peripheral layers. The intermediate layer may be a barrier layer made of a material having barrier properties, for example against gases and/or against oxygen and/or against light. The peripheral layers, which may be the same as each other or different, may be made of materials intended to give the dispensing parts which will be obtained the desired mechanical and/or aesthetic properties. In particular, the peripheral layers may be selected in such a way that they allow the dispensing part to be easily and stably joined to a tube.

In an alternative embodiment, the intermediate layer may comprise a recycled polymeric material or a material with suitable fillers added to it. Interposed between the peripheral layers and the intermediate layer there may be respective auxiliary layers, for example a layer of compatibility promoting material whose purpose is to improve the adhesion between the intermediate layer and the peripheral layers.

The co-extrusion device 7 has an outfeed opening 9 for dispensing the extrudate 8.

In the example illustrated, as visible in FIG. 1, the outfeed opening 9 is facing downwards. The co-extrusion device 7 is configured to dispense an extrudate 8 downwards, according to a vertical or substantially vertical outfeed direction E. However, this condition is not necessary.

The apparatus 1 further comprises a moulding device, which in the example illustrated has the structure of a moulding carrousel 10, only part of which is visible in FIG. 1. The moulding carrousel 10 is rotatable about a respective axis which, in the example illustrated, is positioned vertically. The moulding carrousel 10 is provided, in a peripheral region thereof, with a plurality of moulds 11 each of which is configured to shape a dose of polymeric material, obtained by cutting the extrudate 8, in such a way as to obtain the dispensing part 2 or 102 by compression moulding.

A conveying device 12 is interposed between the co-extrusion device 7 and the moulding carrousel 10. In the example illustrated, the conveying device 12 has the structure of a conveying carrousel. The conveying device 12 comprises a plurality of conveying elements 13, each of which is arranged to convey, towards the moulding carrousel 10, a dose 14 of polymeric material which has been separated from the polymeric material flowing out of the co-extrusion device 7 or more generally out of the dispensing device.

The apparatus 1 further comprises at least one separating element for separating the doses 14 from the extrudate 8.

In the example illustrated, a plurality of separating elements 19 is provided, each separating element 19 being associated with a conveying element 13, in particular supported by the conveying element 13. For example, each separating element 19 may have the structure of a cutting edge which delimits a conveying element 13.

When the separating element 19 passes below the outfeed opening 9, the separating element 19 cuts a dose 14, particularly by scraping it from the outfeed opening. The dose 14 remains adhering to the conveying element 13, particularly to a conveying surface 18 thereof, so that it can be conveyed towards the mould 11.

The separating elements 19 may have a different structure to that illustrated. For example, each separating element 19 could comprise a blade fixed to the conveying element 13.

It is also possible to have a separating element 19 independent of the conveying elements 13, in particular a separating element positioned upstream of the conveying elements 13 and separate from the latter, for example a blade which rotates in a position interposed between the outfeed opening 9 and the conveying elements 13, or a laser beam.

The outfeed opening 9 may have a rectangular shape or a square shape, so as to supply an extrudate 8 in the form of a strip having a rectangular or square cross-section. If the cross-section of the strip is rectangular, the base of the rectangle may be much larger than the height, even if this condition is not necessary.

Figure 3:
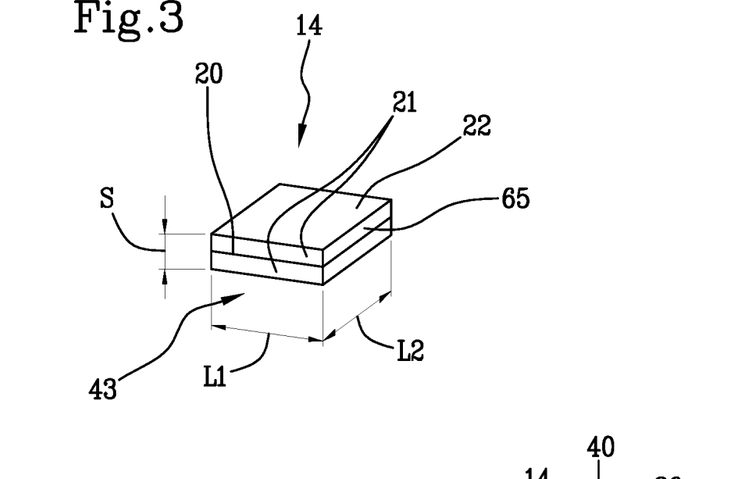
FIG. 3 is a perspective view, schematically illustrating a multi-layer dose processable by the apparatus of FIG. 1.

The separating element 19 is configured to separate from the extrudate 8, in particular by cutting, successive doses 14 each of which, as is better illustrated in FIG. 3, substantially has the shape of a parallelepiped.

The term "substantially" is used here to indicate that, despite the shape of the dose 14 being theoretically a parallelepiped shape, the dose 14 may actually undergo deformations which make its shape not perfectly parallelepiped. That happens because the dose 14 is made of a polymeric material in a viscous state, which is not rigid and may easily be deformed. When the dose 14 is separated from the extrudate 8, a separation surface 65 remains defined on the dose 14, where the dose 14 was previously joined to the extrudate 8. Therefore, the separation surface 65 is a surface where the separating element 19 interacted with the extrudate 8.

The separation surface 65 is arranged transversally, in particular perpendicularly, to the outfeed direction E. The separation surface 65 is substantially flat.

The dose 14 further has a face 22 adjacent to the separation surface. The face 22 is arranged transversally, in particular perpendicularly, to the separation surface 65. In the example illustrated, the face 22 is arranged parallel to the outfeed direction E. The face 22 is substantially flat.

In the example illustrated, the face 22 is a larger face of the parallelepiped defined by the dose 14. In particular, the face 22 has a greater surface area than the surface area of the separation surface 65.

In detail, as shown in FIG. 3, the dose 14 may have a thickness S which is much less than its transversal dimensions L1 and L2, in such a way that it is similar to a "wafer". The transversal dimension L1 is measured along the outfeed direction E of the dose 14 from the co-extrusion device 7, whilst the transversal dimension L2 and the thickness S are measured transversally to that direction. The transversal dimensions L1 and L2 may be equal to each other.

The transversal dimensions L1 and L2 are the dimensions of the face 22. In an embodiment not illustrated, the thickness S may be equal to one of the transversal dimensions L1 or L2. It is also possible that the thickness S is equal to both of the transversal dimensions L1 and L2, in which case the dose has the shape of a parallelepiped with faces which are the same as each other, that is to say, of a cube.

The dose 14 may have a plurality of layers which may comprise an intermediate layer 20, shown in black in the figures, interposed between two peripheral layers 21, shown in white in the figures. The intermediate layer 20 may be a barrier layer made of a material having barrier properties, for example against oxygen and/or against gases and/or against light. Alternatively, the intermediate layer 20 may comprise a recycled polymeric material or a material with appropriate fillers added to it. The intermediate layer 20 is intended to form the central layer 55 of the dispensing part 2 or 102, whilst the peripheral layers 21 are intended to form the outer layer 56 and respectively the inner layer 57.

In an embodiment not illustrated, the dose 14 may have a single-layer structure, that is to say, be formed by a single layer of polymeric material.

The layers which form the dose 14 may be arranged substantially (where the term "substantially" is due to the high deformability of the dose 14, as explained above) parallel to the face 22 of the dose 14.

More specifically, the layers forming the dose may in turn take the form of flat or parallelepiped layers, which are positioned in contact with each other at respective surfaces which are substantially parallel to the face 22.

The conveying device 10 may comprise a central body 15 which, in the example illustrated, is in the form of a drum having a substantially cylindrical geometry. The central body 15 is rotatable about a central axis H owing to a movement device not illustrated. The central axis H may be substantially vertical.

The conveying elements 13 are supported by the central body 15, in a peripheral region of the latter.

When the central body 15 rotates about the central axis H, the conveying elements 13 move along a path from the co-extrusion device 7 towards the mould 11, so as to carry the dose 14 to the mould 11. This movement defines a first movement of the conveying elements 13. The first movement is a transferring movement for transferring the dose 14 along a path towards the mould 11.

In the example illustrated, the path along which the conveying elements 13 move during the transferring movement is a closed path, in particular a circular path around the central axis H. In an alternative embodiment not illustrated, the path of the conveying elements 13 from the co-extrusion device 7 towards the mould 11 could be a non-circular closed path, or a non-closed path, for example linear.

The non-circular closed path is particularly suitable if it is desired that the of the conveying elements 13 overlaps that of the moulds 11 not just at one point, but at a portion with greater length. That allows the conveying element 13 to remain over an element of the mould 11, for a time long enough to ensure that the dose 14 is released into the mould 11 without positioning defects.

Each conveying element 13 is also configured to perform, in addition to the transferring movement and during the transferring movement, a second movement or rotating movement, by rotating about an axis of rotation thereof, which in FIG. 1 is indicated by X and shown for only one conveying element 13. This rotating movement allows the orientation of the dose 14 to be changed, as described in more detail below.

In order to perform the second movement or rotating movement, in the example illustrated, each conveying element 13 is supported by a support 16. A plurality of supports 16 is provided, the supports 16 being positioned in a peripheral region of the central body 15. More specifically, the supports 16 are mounted on a lateral surface of the central body 15. The supports 16 are fixed relative to the central body 15. Each support 16 may have an "L" shape.

Each support 16 supports a conveying element 13, rotatably fixed to the support 16 by a pin 17. Each pin 17 extends along the respective axis of rotation X.

Each axis of rotation X is arranged transversally, in particular perpendicularly, to the central axis H. The axes of rotation X may lie in a single plane and be for example arranged radially relative to the central axis H.

Each conveying element 13 is delimited by the conveying surface 18 suitable for contacting the dose 14 for conveying the dose 14 towards the mould 11.

In the example illustrated, the conveying surface 18 is flat. This structure of the conveying surface 18 is particularly suitable for conveying doses 14 which have the shape of a parallelepiped, as shown in FIG. 1.

While the conveying element 13 conveys the dose 14 towards the mould 11, the face 22 of the dose 14 is arranged in contact with the conveying surface 18.

The intermediate layer 20 lies in a plane substantially parallel to the conveying surface 18.

The conveying element 13 may have a suction device, not illustrated, which is selectively operable for retaining the dose 14 in contact with the conveying surface 18 during conveying.

The conveying element 13 may also have a blowing device, not illustrated, which is selectively operable for making it easier to detach the dose 14 from the conveying surface 18, so that the dose 14 can be delivered to the mould 11.

In an embodiment not illustrated, in place of the blowing device or in combination with it, the conveying element 13 may be provided with a sort of piston, that is to say, a mechanical element which, at the appropriate moment, pushes the dose 14 downwards, thereby helping the dose 14 to detach itself from the conveying surface 18 so that it can be released into the mould 11

The conveying element 13 may be provided with a thermal conditioning device, in particular in the form of a heating device, so as to avoid excessive cooling of the dose 14 during conveying. Alternatively, the thermal conditioning device may be in the form of a cooling device, so as to avoid excessive adhering of the dose 14 to the conveying element 13, if the conveying element 13 tends to overheat.

A second movement device, not illustrated, is associated with each conveying element 13. The second movement device may for example be housed in the central body 15, for rotating the conveying element 13 about the relative axis of rotation X, so that the conveying element 13 can perform the rotating movement.

The second movement device is distinct from the first movement device. In the example illustrated, the conveying element 13 is positioned, for most of the path around the central axis H, in such a way that the conveying surface 18 is facing downwards, in particular lying in a horizontal plane.

In one region of its own path around the central axis H, the conveying element 13 passes near to the co-extrusion device 7, in particular below the outfeed opening 9, from which the extrudate 8 comes out.

Upstream of the co-extrusion device 7, the conveying element 13 rotates about the respective axis of rotation X thereby positioning itself in a collecting configuration P, shown in FIG. 1, in which the conveying element 13 collects a dose 14 separated from the extrudate 8. In the collecting configuration P, the conveying surface 18 may be vertical, or tilted slightly backwards relative to the vertical direction.

In this way the dose 14, which comes out of the outfeed opening 9 along the substantially vertical outfeed direction E, rests on the conveying surface 18, which is also positioned substantially vertically, consequently adhering to the conveying surface 18 owing to the viscosity of the polymeric material. More generally, in the collecting configuration P, the conveying element 13 is positioned in such a way that the conveying surface 18 is substantially parallel to the outfeed direction E of the dose 14 from the co-extrusion device 7.

The dose 14 is received by the conveying element 13 in the collecting configuration P, whilst the dose 14 has an initial orientation which in the example illustrated is substantially vertical. In an alternative embodiment, in the collecting configuration P, the dose 14 could have a non-vertical orientation, for example because the outfeed direction E is not vertical.

After having received the dose 14 in the collecting configuration P, while the conveying element 13 is moved around the central axis H by the central body 15 (transferring movement), the conveying element 13 continues to rotate about the corresponding axis of rotation X (rotating movement). The conveying element 13 rotates about the axis of rotation X until it reaches a releasing configuration R, shown in FIG. 1, in which the dose 13 is released into the mould 11, as described in more detail below. In the releasing configuration R, the conveying surface 18 is facing downwards and may be, in particular, substantially horizontal.

In the releasing configuration R, the dose 14 has a final orientation which makes it suitable for being released into the mould 11.

After the dose 14 has been released into the mould 11, the conveying element 13 may remain in the releasing configuration R, that is to say, with the conveying surface 18 facing downwards, until the conveying element 13 returns near to the outfeed opening 9 of the co-extrusion device 7, and upstream of the latter.

Figure 2:
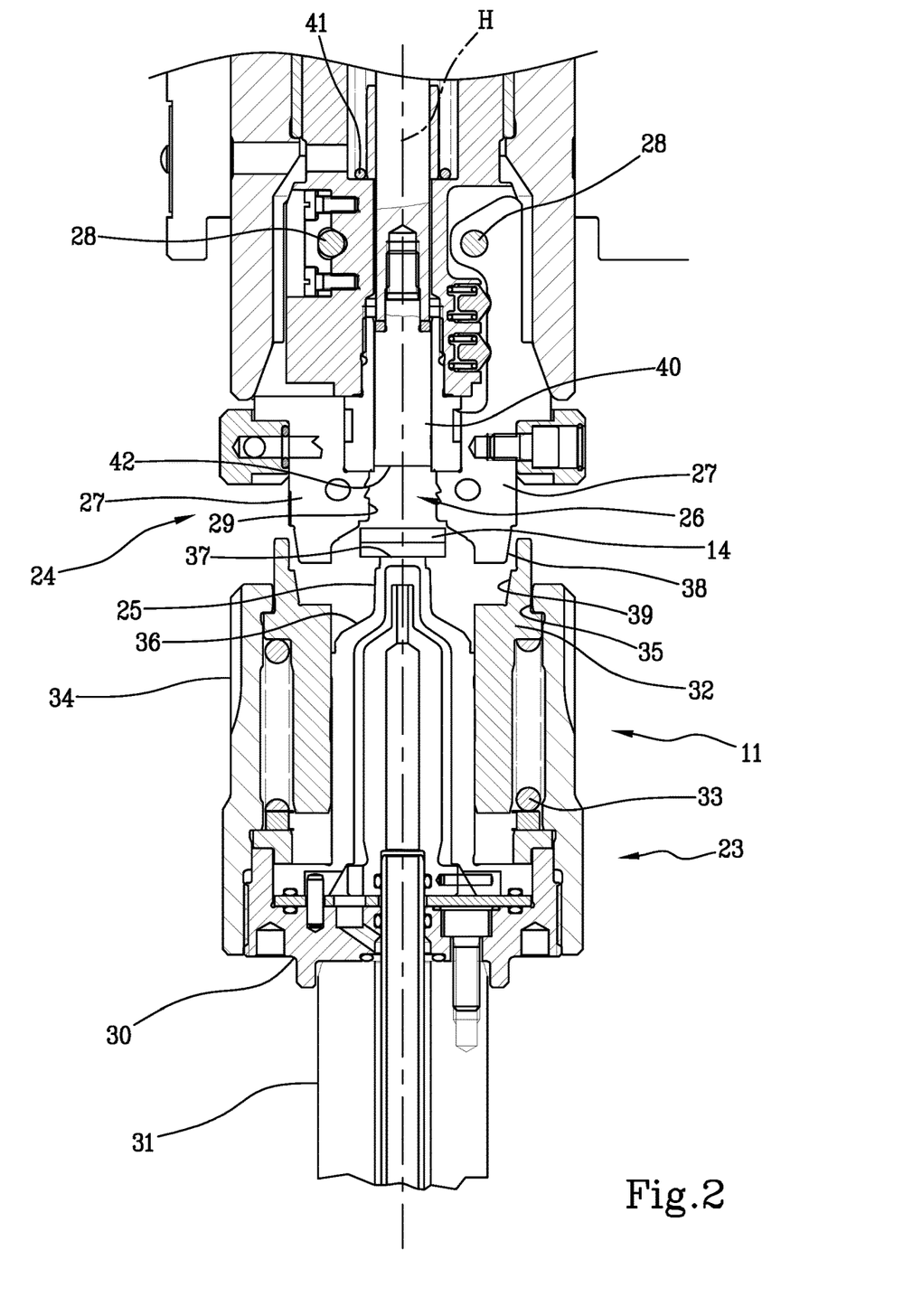
FIG. 2 is a partial cross-section, showing a mould of the apparatus of FIG. 1.

As is better illustrated in FIG. 2, each mould 11 comprises a first mould part 23 and a second mould part 24, which are aligned with each other along a moulding axis Y, which may be vertical. The first mould part 23 may comprise a punch 25, arranged to shape an inner surface of the dispensing part 2. In contrast, the second mould part 24 is intended to define a cavity 26, also shown in FIG. 4, in which the dose 14 is shaped.

The first mould part 23 is arranged below the second mould part 24.

The first mould part 23 may comprise a base element 30, which supports the punch 25.

The base element 30 may be fixed to one end of a rod 31, connected to an actuator, for example of the hydraulic or mechanical type, for moving the first mould part 23 relative to the second mould part 24 along a moulding direction parallel to the moulding axis Y.

The first mould part 23 may also comprise a sleeve 32, which surrounds the punch 25.

The sleeve 32 may be movable between an extended position shown in FIG. 2, in which the sleeve 32 projects towards the second mould part 24, and a retracted position not illustrated, in which the sleeve 32 is further from the second mould part 24. The sleeve 32 is pushed into the extended position by an elastic element 33, which may comprise a helical spring. The sleeve 32 may be brought into the retracted position by overcoming the thrust of the elastic element 33.

The sleeve 32 is movable between the extended position and the retracted position by sliding along the moulding direction, that is to say, parallel to the moulding axis Y.

The first mould part 23 may also comprise a fixing ring 34, suitable for being fixed to the base element 30, in particular by screwing the fixing ring 34 on the base element 30, in order to keep the punch 25 fixed relative to the base element 30.

The fixing ring 34 allows limiting of the movement of the sleeve 32 which, in the extended position, makes contact against an inner rim 35 of the fixing ring 34.

The punch 25 is delimited by a first forming surface 36, suitable for internally shaping the edge zone 3, the neck 4 and the intermediate portion 6 of the dispensing part.

The punch 25 is furthermore delimited by a resting surface 37, suitable for supporting the dose 14 in the releasing position R, that is to say, when the dose 14 is released by the conveying element 13. In fact, as described in more detail below, since the punch 25 is positioned below the cavity 26, the dose 14 is positioned on the punch 25 when it detaches from the conveying element 13.

The resting surface 37 may be a flat surface.

In plan view, the resting surface 37 may have a circular shape.

The resting surface 37 is arranged transversally, in particular perpendicularly, to the moulding axis Y.

The resting surface 37 delimits an upper region of the punch 25, at the moulding axis Y and near to the latter.

The resting surface 37 may be substantially parallel to the conveying surface 18, when the conveying element 13 is in the releasing configuration R.

The second mould part 24 may comprise two or more movable inserts 27, which may be moved between a forming position, shown in FIG. 2, and a disengaging position, not illustrated. In the forming position, a second forming surface 29 is defined between the movable inserts 27, the second forming surface 29 being intended to shape the outer surface of the edge zone 3, of the intermediate portion 6 and of the neck 4, including the thread 5 of the dispensing part 2. In the disengaging position, the movable inserts 27 move away from each other to allow a dispensing part 2 just formed to be extracted from the mould 11. In particular, in the disengaging position, the movable inserts 27 allow the extraction from the mould 11 of undercut parts of the neck 4, for example the thread 5.

The movable inserts 27 may be moved between the forming position and the disengaging position by rotating about respective pins 28. In this case, the movable inserts 27 may be shaped like levers hinged to the pins 28. In more detail, the movable inserts 27 are hinged to the pins 28 at respective end regions of the movable inserts 27 opposite to the second forming surface 29.

In the example illustrated, each movable insert 27 is delimited, near its end on which the second forming surface 29 is made, by an outer surface 38. When the movable inserts 27 are in the forming position, their outer surfaces 38 define a frustoconical surface suitable for shapingly coupling with an inner surface 39, made on the sleeve 32. This ensures that the first mould part 23 is positioned in such a way that it is centred on the moulding axis Y, relative to the second mould part 24.

The second mould part 24 further comprises a central forming member 40, arranged in a central position relative to the movable inserts 27.

The central forming member 40 may be mounted in a stationary position along the moulding axis Y. The movable inserts 27 may be movable along the moulding axis Y relative to the central forming member 40, for example against the action of a spring 41.

The central forming member 40 is delimited by a forming surface 42, suitable for operating in conjunction with the resting surface 37 of the punch 25 for shaping the membrane 43 of the dispensing part, as described in more detail below.

During operation, an extrudate 8, comprising for example a plurality of layers of polymeric material, is dispensed by the co-extrusion device 7 and comes out of the outfeed opening 9 along the outfeed direction E, as shown in FIG. 1. The layers which form the extrudate 8 lie in respective plans which are parallel to each other and to the outfeed direction E.

The central body 15 of the conveying device 12 rotates, for example continuously, about the central axis H. The conveying elements 13 supported by the central body 15 in this way move along a closed path, which in the example illustrated is shaped like a circle centred on the central axis Z. This is the first movement, or transferring movement, of the conveying elements 13.

The path of the conveying elements 13 passes below the outfeed opening 9 of the co-extrusion device 7 in a dispensing zone in which the doses 14 are dispensed Upstream of that dispensing zone, each conveying element 13 rotates about the corresponding axis of rotation X, so that the conveying element 13 is in the collecting configuration P, when the conveying element 13 is below the outfeed opening 9 of the co-extrusion device 7. In that configuration, the conveying element 13 interacts with the extrudate 8, from which a dose 14 is separated owing to the separating element 19. The latter cuts the dose 14 along the separation surface 65, in particular immediately below the outfeed opening 9. The dose 14 rests on the conveying surface 18, which is arranged parallel, or almost, to the face 22 of the dose 14.

In the collecting configuration P, the conveying surface 18 is also arranged parallel, or almost, to the intermediate layer 20 of the dose 14.

The conveying surface 18 has a larger surface area than the surface of the dose 14 facing the conveying surface 18, that is to say, than the face 22. The dose 14 is collected by the conveying element 13 whilst the dose 14 has an initial orientation, which in the example illustrated is substantially vertical. The dose 14 adheres to the conveying surface 18 without undergoing significant deformations. Even the intermediate layer 20 remains substantially undeformed.

The conveying element 13 now moves away from the co-extrusion device 7 carrying the dose 14 with it. The dose 14 remains adhering to the conveying surface 18 owing to its viscosity and possibly owing to the suction device of the conveying element 13, which retains the dose 14 in contact with the conveying surface 18.

Simultaneously, the conveying element 13 continues rotating about the respective axis of rotation X, thereby changing the orientation of the dose 14 until the dose 14 is brought into a final orientation in the releasing configuration R. This is the rotating movement of the conveying element 13. In the releasing configuration R, the conveying surface 18 of the conveying element 13 is facing downwards and in particular is oriented horizontally, like the dose 14 adhering to it.

Therefore, when passing from the collecting configuration P to the releasing configuration R, the dose 14 is turned from the initial orientation to the final orientation.

The path of the conveying element 13 overlaps the path of the moulds 11 at least at one point, where the dose 14 is released by the conveying element 13 onto the punch 25.

At that point, the conveying element 13 is in the releasing configuration R and is also interposed between the first mould part 23 and the second mould part 24, which are at a distance from each other.

The conveying element 13 now releases the dose 14 which it is conveying. The dose 14 is deposited on the punch 25, in particular on the resting surface 37 which delimits the top of the punch. That can happen with the aid of the blowing device or a mechanical element, which act on the dose 14 so as to detach it from the conveying surface 18.

It should be noticed that the resting surface 37 is horizontal, that is to say, parallel to the surface of the dose 14 facing it, when the dose 14 is in the final orientation (corresponding to the releasing configuration R). The resting surface 37 of the punch 25 is also parallel to the conveying surface 18 of the conveying element 13, when the latter is in the releasing configuration R.

This minimises deformations of the dose 14 when the latter passes from the conveying element 13 to the punch 25.

Moreover, when the conveying element 13 is in the releasing configuration R (corresponding to the final orientation of the dose 14), the distance between the dose 14 and the resting surface 37 of the punch 25 is minimal, or even null. The conveying element 13 therefore allows control of the position of the dose 14 until the latter passes onto the punch 25. This too allows the prevention of unwanted deformations of the dose 14, which could compromise its correct positioning on the resting surface 37.

The dose 14 may be correctly positioned on the resting surface 37 also owing to its parallelepiped shape. In fact, the dose 14 is delimited by a plurality of flat faces, including a further face 43, opposite to the face 22, which is intended to rest on the resting surface 37 of the punch 25. The flat shape of the further face 43 allows the dose 14 to remain stably resting on the resting surface 37.

The stability of the dose 14 is increased when, as in the example illustrated, the dose 14 has a thickness S which is, even significantly, less than its transversal dimensions L1 and L2. This allows the position of the centre of gravity of the dose 14 to be lowered, when the dose is resting on the punch 25.

After having released the dose 14 onto the resting surface 37 of the punch 25, the conveying element 13 moves away from the mould 11.

The sleeve 32 is in the extended position shown in FIG. 2, whilst the movable inserts 27 are in contact with each other in the forming position.

The first mould part 23 is gradually moved towards the second mould part 24, thereby moving the dose 14 towards the movable inserts 27. In the position of FIG. 2, the dose 14 has made contact with the movable inserts 27.

As the movement of the first mould part 23 towards the second mould part 24 along the moulding direction Y continues, the movable inserts 27 engage with the sleeve 32. More specifically, the outer surface 38 shapingly couples with the inner surface 39. That allows the first mould part 23 to be centred relative to the second mould part 24, and also allows the movable inserts 27 to be kept in the forming position, that is to say, in contact with each other, despite the pressure applied by the material of the dose 14, which would otherwise tend to move the movable inserts 27 away from each other. When the sleeve 32 has made contact with the movable inserts 27, between the punch 25, the movable inserts 27, the central forming member 40 and the sleeve 32 a closed forming chamber is defined, inside which the dose 14 will be shaped to obtain the dispensing part 2. This forming chamber initially has a volume greater than the volume of the dispensing part 2. The volume of the forming chamber is gradually reduced, while the first mould part 23 is pushed towards the second mould part 24. When that happens, the sleeve 32 is pushed towards the retracted position by the movable inserts 27, which apply a force able to compress the elastic element 33.

Figure 4:
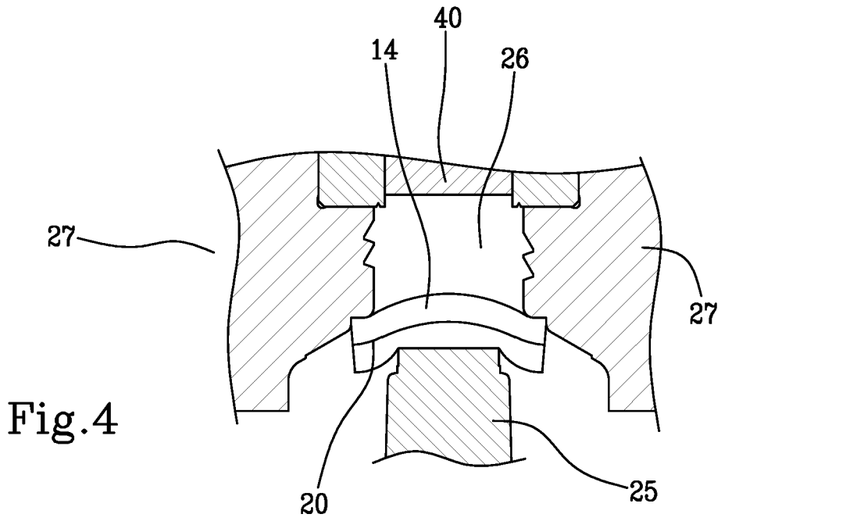
FIG. 4 is a schematic cross-section, showing a portion of mould in a step after that of FIG. 2.
Figure 5:
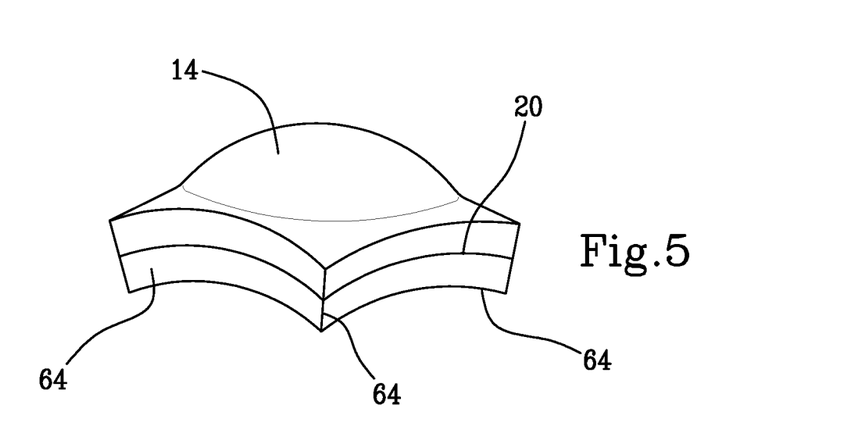
FIG. 5 is a perspective view, showing how a multi-layer dose is shaped in the mould, in the position of FIG. 4.

FIGS. 4 and 5 schematically illustrate a step in which the dose 18 is being deformed between the punch 25 and the movable inserts 27. The forming chamber has not yet reached its definitive shape and volume. It should be noticed that a central portion of the dose 14 has adopted a dome shape in its surface facing the central forming member 40. Four corner portions 64 project from the central portion of the dose 14, the corner portions 64 corresponding to the corner regions of the parallelepiped shape which the dose 14 initially had.

The intermediate layer 20 emerges on the lateral faces of the dose 14.

As movement of the first mould part 23 towards the second mould part 24 continues, the dose 14 is completely shaped, until a closed position of the mould 11 is reached, in which the forming chamber has a shape corresponding to the shape of the dispensing part 2.

In particular, in the closed position, between the resting surface 37 of the punch 25 and the central forming member 40, the membrane 43 (or 143), which closes the passage 50 surrounded by the neck 4 is shaped. Therefore, in the closed position the resting surface 37 is not in contact with the central forming member 40, but is placed at a distance from the central forming member 40 corresponding to the thickness of the membrane 43 (or 143).

After the dispensing part 2 has been left in the mould 11 for long enough for its shape to stabilise, the mould 11 may be opened so as to remove the dispensing part 2 and begin a subsequent moulding of a new dose 14. Downstream of the mould 11 a cutting device may be provided, the cutting device being suitable for performing the cutting step by which the membrane 43 or 143 is removed.

The cutting device may be provided on the apparatus 1, or in a position downstream of the apparatus 1 along a container production line, particularly for tube packages.

The cutting device may in particular be interposed between the mould 11 in which the dispensing part is produced and a welding unit in which the dispensing part is fixed to the container body, in particular to the tube.

If it is desired to obtain an open dispensing part 2b of the type shown in FIG. 7, the cutting device may comprise a circular blade, rotatable about its own axis in the cutting plane P1. The cutting device may further comprise a motor device for causing a rotating movement of the dispensing part 2 and the blade relative to each other. In particular, the dispensing part 2 may be rotated about the axis Z, whilst an axis of the circular blade remains in a stationary position. It is also possible to keep the dispensing part 2 stationary and to rotate the axis of the circular blade around the dispensing part 2, so that the circular blade interacts with the end portion 60 over an angle of 360° about the axis Z, for separating the end portion 60 from the neck 4.

The cutting device which cuts the end portion 60 may be similar to the cutting device which, in prior art machines for making caps by compression moulding, creates a cutting line which separates a cup-shaped body of the cap from the tamper-evident ring.

If the membrane 43 is instead removed with a frontal cut, so as to obtain an open dispensing part 2a of the type shown in FIG. 8, the cutting device may comprise a suitable blade, which interacts with the membrane 43 from the inside or from the outside of the dispensing part 2. In this case too, it is possible to rotate the blade around the axis Z and keep the dispensing part 2 stationary, or vice versa.

Both in the embodiment of FIG. 7 and in that of FIG. 8, in place of the blade it is possible to use a different type of cutting element, for example a laser beam.

The cutting device will of course be absent if the membrane is pierced or removed by the user.

In an embodiment not illustrated, in the mould 11the punch 25 may be positioned above the cavity 26. In this case, the dose 14 may be released by the conveying element 13 into the cavity 26, or delivered to the punch 25 which, although being positioned above the cavity 26, retains the dose 14 with the aid of a source of suction.

If the method and the apparatus described above are used in combination with a dose 14 having a multi-layer structure, a dispensing part 2 or 102 of a container is obtained in a simple way, with a central layer 55 evenly distributed in the dispensing part. The thickness of the central layer 55 may even be very small, which allows the quantity of material which forms the central layer 55 to be kept below a minimum percentage, so as to allow recycling of the dispensing part after its use.

The invention claimed is:

1. A method comprising in sequence the steps of:
dispensing a continuous polymeric extrudate in a molten state;
separating from the continuous extrudate a dose substantially having the shape of a parallelepiped, the dose having a separation surface at which the dose has been separated from the continuous extrudate, the dose further having a face adjacent to the separation surface;
conveying the dose towards a mould comprising a first mould part and a second mould part;
shaping the dose in the mould by moving the first mould part and the second mould part one towards the other in a moulding direction arranged transversally to said face, thereby obtaining a dispensing part of a container, the dispensing part comprising:
an edge zone;
a neck surrounding a passage through which a product contained in the container can be dispensed;
a membrane which closes the passage, the passage being intended to be opened after
the shaping step, so that said product can flow out,
wherein the method further comprises the step of joining the dispensing part to a container body at the edge zone of the dispensing part;
wherein the passage is opened by removing the membrane in a cutting step performed downstream of the mould and outside the mould, before applying a closing element on the neck,
the cutting step being performed before joining the dispensing part to the container body.

2. The method according to claim 1, wherein the dose has a multi-layer structure and comprises a plurality of layers which are arranged substantially parallel to said face.

3. The method according to claim 1, wherein the membrane is removed by cutting an end portion of the dispensing part along a cutting plane arranged transversally to an axis around which the neck extends, thereby creating a free edge in the cutting plane.

4. The method according to claim 3, wherein the end portion of the dispensing part is shaped like a convex projection having a concavity facing towards the edge zone.

5. The method according to claim 1, wherein the membrane is removed by cutting the membrane frontally along a closed cutting line.

6. The method according to claim 5, wherein the closed cutting line is a circular cutting line concentric with the neck.

7. The method according to claim 1, wherein, during the conveying step, the orientation of the dose is changed so that it passes from an initial orientation, which the dose has at the end of the dispensing step, to a final orientation, in which said face is arranged transversally to the moulding direction.

8. The method according to claim 7, wherein in the initial orientation said face lies substantially in a plane positioned parallel to the moulding direction.

9. The method according to claim 7, wherein, in the conveying step, the dose performs a transferring movement along a path towards the mould and, in addition to the transferring movement, a rotating movement in order to change the orientation.

10. The method according to claim 1, wherein the first mould part comprises a punch and in the second mould part a cavity is definable, the punch being arranged below the cavity.

11. The method according to claim 10, wherein, during the conveying step, the orientation of the dose is changed so that it passes from an initial orientation, which the dose has at the end of the dispensing step, to a final orientation, in which said face is arranged transversally to the moulding direction, and wherein the punch is delimited, in an upper region thereof, by a flat resting surface, and wherein, in the final orientation, said face of the dose is facing the resting surface.

12. The method according to claim 1, wherein the membrane has a thickness which is less than that the thickness of an intermediate portion of the dispensing part, the intermediate portion being interposed between the neck and the edge zone.

13. The method according to claim 1, wherein in the membrane there are at least two layers of materials which are different from each other and which form the dispensing part.

14. The method according to claim 11, wherein, in the final orientation, said face of the dose is substantially parallel to the resting surface.

* * * * *